No. 725,523. PATENTED APR. 14, 1903.
H. P. WELLMAN.
ELECTRIC ARC LAMP.
APPLICATION FILED DEC. 3, 1902.
NO MODEL. 3 SHEETS—SHEET 2.
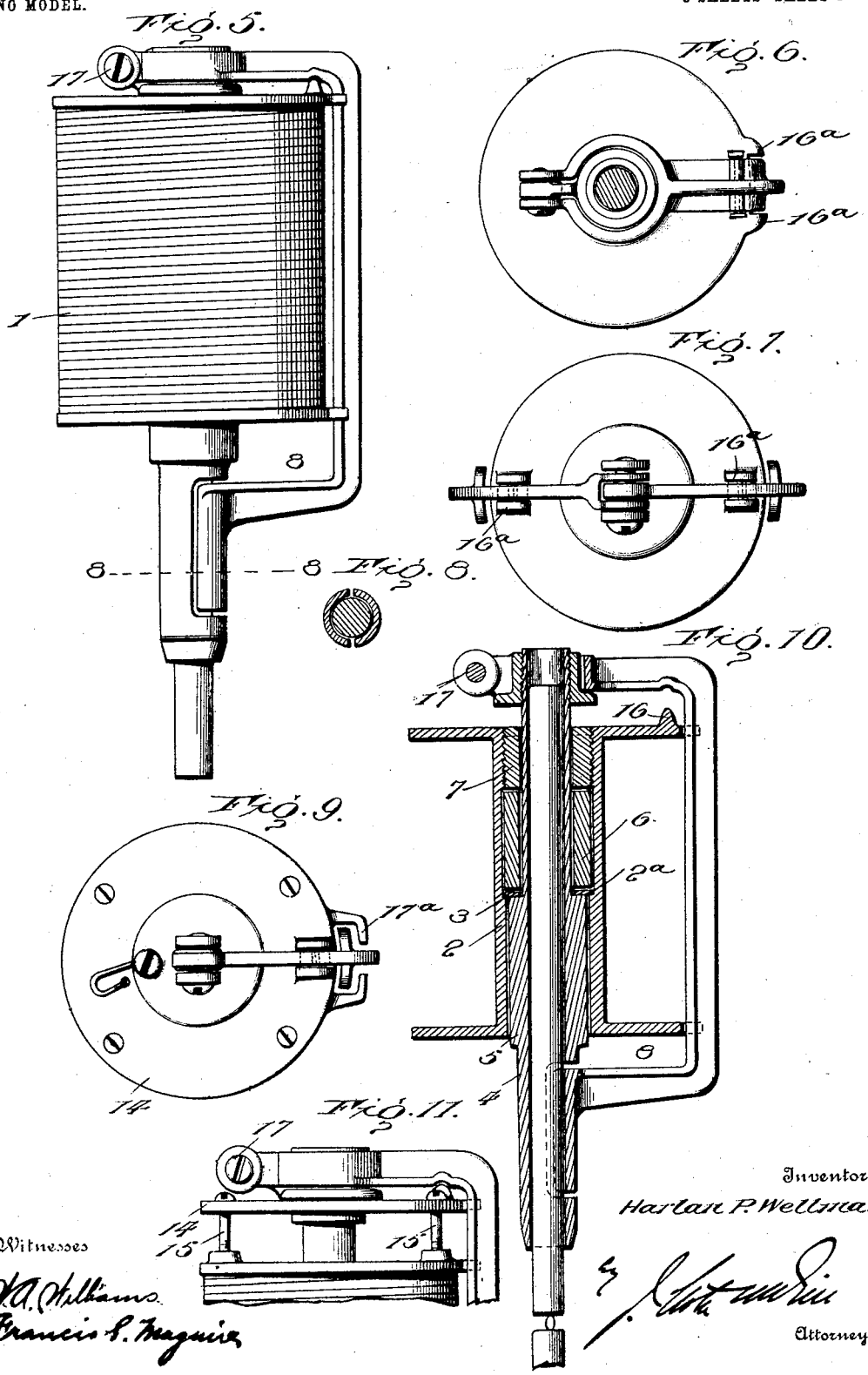
Witnesses
Inventor
Harlan P. Wellman
Attorney No. 725,523. PATENTED APR. 14, 1903.
H. P. WELLMAN.
ELECTRIC ARC LAMP.
APPLICATION FILED DEC. 3, 1902.
NO MODEL. 3 SHEETS—SHEET 3.
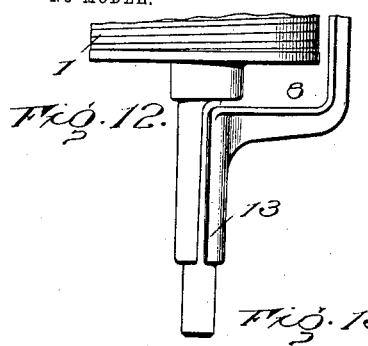
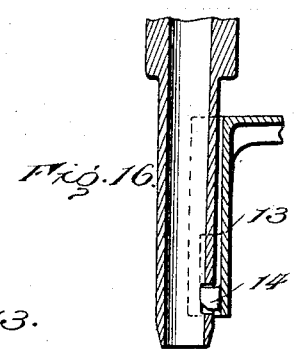
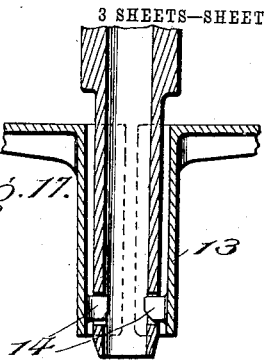
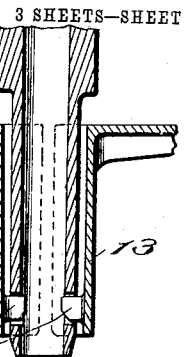
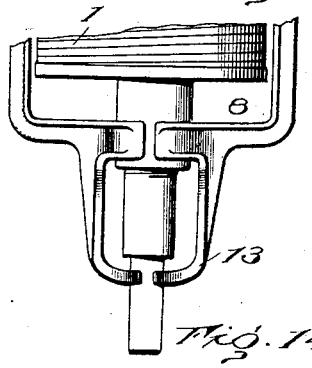
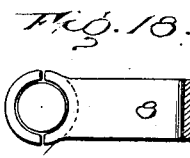
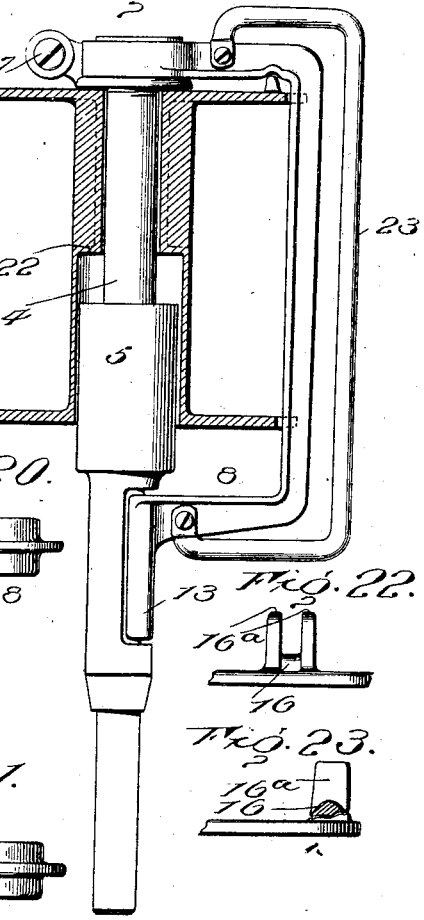
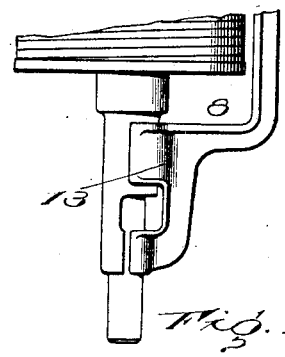
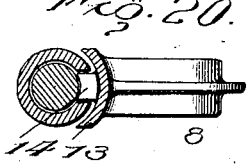
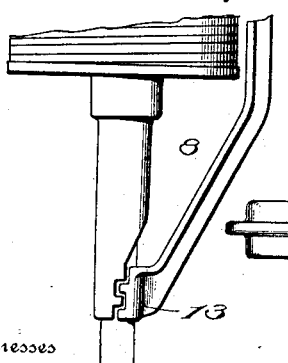
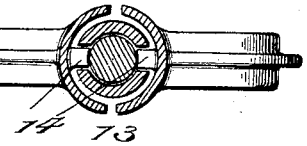
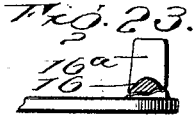
Witnesses
Inventor
Harlan P. Wellman
By
Attorney

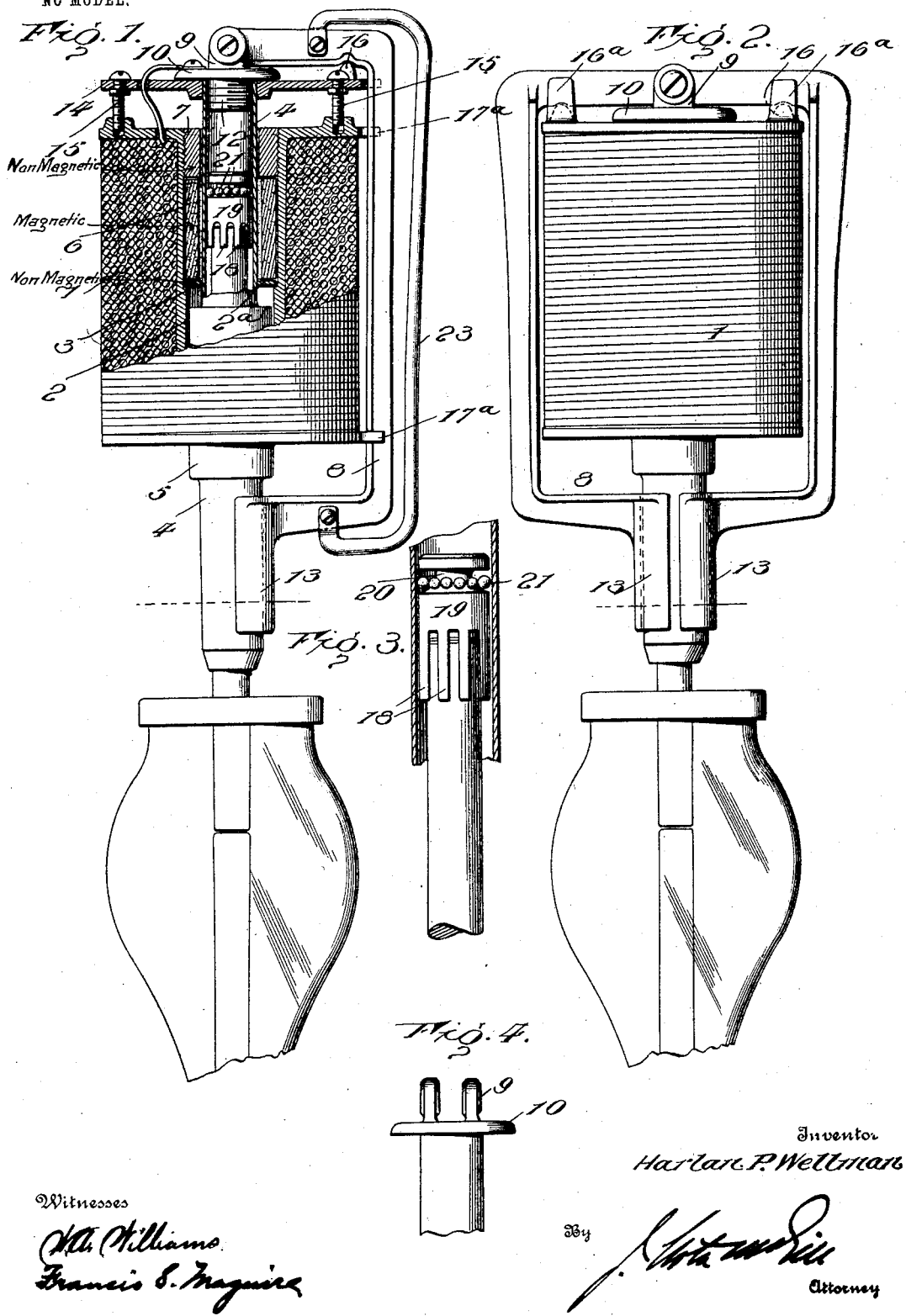

UNITED STATES PATENT OFFICE.

HARLAN P. WELLMAN, OF ASHLAND, KENTUCKY.

ELECTRIC-ARC LAMP.

SPECIFICATION forming part of Letters Patent No. 725,523, dated April 14, 1903.

Application filed December 3, 1902. Serial No. 133,657. (No model.)

*To all whom it may concern:*

Be it known that I, HARLAN P. WELLMAN, of Ashland, in the county of Boyd and State of Kentucky, have invented certain new and useful Improvements in Arc-Lights; and I do hereby declare the following to be a full, clear, and exact description of the invention, such as will enable others skilled in the art to which it appertains to make and use the same.

The object of this invention is to provide an improved carbon-clutch for electric-arc lamps, so that the carbons will be firmly gripped and held in the starting and during the continuance of the arc.

A further object is to provide improved means for automatically connecting the carbon to the lamp-circuit, which means will allow of the ready adjustment of the carbon either under the action of its clutch or when freed thereof; and further objects are to provide improved means for varrying the current consumed by the lamp, to provide additional magnetic lines of force to aid in the creation of the arc, and, finally, to simplify the construction and promoting the general efficiency of lamps of this character.

The invention will be hereinafter fully set forth, and particularly pointed out in the claims.

In the accompanying drawings, Figure 1 is a view in side elevation with parts broken away, showing my improvements. Fig. 2 is a side view showing the single clutch of Fig. 1 duplicated. Fig. 3 is an enlarged view showing the means for connecting the carbon to the lamp-circuit, a portion only of the armature being indicated. Fig. 4 shows the upper end of armature and pivotal connection for carbon-clutch. Fig. 5 shows a modified form of connection for the carbon-clutch. Fig. 6 is a top plan view thereof. Fig. 7 is a top plan view of Fig. 2. Fig. 8 is a cross-sectional view on line 8 8, Fig. 5. Fig. 9 is a top plan view of Fig. 1. Fig. 10 shows in sectional detail the parts indicated by Fig. 5. Fig. 11 shows the carbon-clutch pivoted at one side of the armature. Figs. 12, 13, 14, and 15 show various modifications in the formation of the carbon-engaging ends of the carbon-clutch. Fig. 16 is a sectional view of the carbon-engaging end of the clutch shown in Fig. 1. Fig. 17 is a similar view of the forms shown in Fig. 2. Fig. 18 is a plan view of the bottom portion of the clutch of the form shown in Figs. 5, 10, 12, and 19. Fig. 19 is a view showing the details of another modified form of my improvement. Fig. 20 is a sectional detail view of the form of clutch shown in Figs. 1 and 16. Fig. 21 is a similar view of the form shown in Figs. 2 and 17. Figs. 22 and 23 are views of the clutch fulcrum-bearing.

Referring to the drawings, 1 designates the magnet-coil, the central tubular portion 2 of the spool of which has a central shoulder 3.

4 is a hollow armature of magnetic material formed with a central enlarged section 5 at about its longitudinal center. Within the tubular portion 2, supported by a non-magnetic ring $2^a$, resting on the shoulder 3, is a collar 6, of magnetic material, held against ring $2^a$ by a plug 7, of non-magnetic material. The diameter of the opening of collar 6 is greater than the diameter of the upper reduced portion of the armature and also greater than the diameter of the openings in ring $2^a$ and plug 7, the armature being guided and held from contacting with the collar by engagement with the non-magnetic ring and plug. This prevents the armature from holding direct to the magnetic collar when the current is off by the residual magnetism in the magnetic parts. Any contact between the collar and the armature would tend to cause a slowness of motion of the armature when striking an arc, the collar otherwise serving to augment the lines of magnetic force and aid the upward movement of the armature.

8 designates the carbon-clutch. This consists of an arm of magnetic material secured at one end to the upper end of the armature, so as to be raised and lowered by the latter, and when moved in one direction is designed to engage the carbon to effect the formation of the arc and when moved in the opposite direction to release its hold on the carbon, and thereby permit of the automatic lowering thereof. The clutch-arm is shown in Fig. 1 as pivotally connected to two lugs 9 of a disk 10, which disk is secured to the armature, preferably by a threaded extension 12. This disk serves as a stop to limit the downward movement of the armature. The clutch-arm is carried outwardly from its pivotal connection to one side of the magnet-coil and thence downwardly and inwardly, terminating at its lower end in a widened portion 13, curved transversely on a somewhat greater radius than the lower tubular portion of the armature or the carbon-rod. In the former instance the curved portion 13 is equipped with a tooth 14 for engaging the carbon, such tooth extending through an opening in the armature. (See Figs. 16 and 20.) In some instances, however, the tooth may be dispensed with and the curved portion of the clutch-arm itself directly engage the carbon, as shown in Figs. 5, 10, 12, and 19. The lines of magnetic force pass through the extended area or the engaging portion 13 to the armature-core, one of these acting as the north pole and the other as the south pole, with a powerful attraction between the opposing surfaces. The reason for giving the engaging portion 13 a relatively larger cross-sectional area than its supporting part is that the magnetic lines of force must pass through a slight air-gap to complete the circuit, which air-gap offers considerably more resistance to the passage of the magnetic lines of force than they experience in their travel through the magnetic clutch-arm. In all forms the carbon must be gripped or clutched before there is any possibility of the two poles coming together. In fact, there must be no contact between the engaging portion 13 of the clutch and the adjacent tubular portion of the armature. On the top of the spool of the magnet-coil or on a plate 14, adjustably secured thereto by screws 15, (see Fig. 1,) is a fulcrum-bearing 16, with which the clutch-arm is designed to engage in the downward travel of the armature, so that being turned or swung lever-like thereon in the further movement of the armature the lower or engaging end will be thrown outward and allow the carbon to descend by gravity. Guide-plates 16ª on each side of the fulcrum-bearing, Figs. 1 and 2, or at the edge of the top and bottom of the coil, Figs. 5, 6, 10, and 11, serve to prevent the clutch-arm from swinging around the axial center of the armature or from getting out of line with its fulcrum-bearing.

In practice after the current is turned on the armature-clutch and carbon are raised to the upper limit of movement with normal length of arc. The lamp will continue to burn until the carbons are separated to such an extent that the reduced current (owing to resistance of the long arc) is unable to hold the armature, &c., at the normal height, and consequently they will descend by gravity. In this descent and before the disk 10 limits the downward movement of the armature the clutch-arm engages the fulcrum-point 16, and, being balanced thereon, releases engagement with the carbon, which latter at once falls into contact with the lower carbon. This, as is well known, permits the lamp to resume its normal arc through the action of the armature, causing the upward movement of the clutch-arm and the inward swing of the lower engaging end thereof, such end contacting with the carbon before the armature has reached the upward limit of its movement under the magnetic influence of coil 1 and collar 6.

In Fig. 2 I have shown the clutch-arm duplicated, so that engagement with the carbon may be had at diametrically opposite points. A similar idea is contemplated in the form shown in Fig. 13. As indicated in Figs. 14 and 15, the engaging portion of the clutch-arm may be formed in various ways, and, as indicated in Figs. 5, 10, 12, and 19, as well as in some of the others, when the opening in the armature will permit, the engaging portion of the clutch may contact directly with the carbon, the tooth being omitted. As shown in Figs. 5, 6, 10, and 11, the clutch-arm instead of being connected directly in line with the top of the armature may be secured thereto at one side, as shown at 17. One advantage of this is that the upper end of the armature is left open to allow the carbon-rod to be dropped into place from above instead of being thrust upward from below, as is required when the disk 10 is employed.

In Figs. 1 and 9 I have shown stops 17ª for limiting the outward movement or swing of the magnetic clutch-arm when balanced on its fulcrum.

18 designates the ordinary spring-fingers for engaging and holding the upper end of the carbon-rod. These fingers extend from a head 19, located within the upper tubular portion of the armature, which head is formed with a circumferential groove 20 of peculiar formation. The upper wall of this groove is perfectly flat or horizontal, and from its inner portion it extends downward on a curved line, terminating at the periphery of the cylindrical head 19. Within this groove are located contact balls or rollers 21, which in the upward movement of the armature by moving upwardly and inwardly in the groove prevent any binding, while as the armature is moving downwardly the balls will assume their normal position at the base of the groove, and thereby effectively connect the carbon to the lamp-circuit.

In Fig. 19 I have shown my improvements with the magnetic collar 6 omitted, the armature depending entirely upon the magnetic lines of force for its upward movement unaided by the magnetic collar. The upward movement of the armature is limited by the central enlarged portion thereof engaging a shoulder 22 in the center of the magnet-coil.

In all forms the clutch-arm should be constructed as light as possible, so as to insure its being moved by the armature, and as this would necessarily decrease the sectional area of the arm, thereby decreasing the lines of magnetic force, I employ an auxiliary conveyer of such lines between the upper and lower portions of the clutch-arm. This is shown in the form of a flexible magnetic cable 23, connected to the arm at two points—top and bottom. (See Figs. 1 and 19.) This cable while not retarding or affecting the movements of the clutch-arm increases the sectional area thereof and permits of a better and firmer grip upon the carbon with a given amount of current, such arm being of the lightest weight possible consistent with sufficient mechanical strength and stiffness.

The advantage of employing the adjustable plate 14 is that it permits of a variation of the current consumed by the lamp, since the plate may be moved toward or away from the magnet-coil, and thus control the extent of movement of the armature, the descent of which is limited by the stop-disk engaging such plate. This adjustable plate may be a part of or secured to the main lamp-frame, to which the resistance-coils are secured.

From what has been said it will be seen that when the armature and clutch are simultaneously magnetized the instantaneous movement of the clutch-arm on its fulcrum aids the magnetic lines of force in starting the upward movement of the armature, and thus striking the arc, the leverage of the longer portion of the clutch-arm having the tendency to move the armature as stated. Hence the armature moves very little farther than the carbon. In fact, their movements are almost equal, since the armature can move but a slight extent before the carbon is engaged by the lower end of the clutch-arm, after which the carbon clutch-arm and armature move in unison until arrested by the armature engaging the central stop in the magnet-coil.

The magnet-spool may be made of magnetic metal, such as iron or steel, in which event a slight modification of the construction herein described would be necessary.

The lamp is equally adapted for alternating or direct current; but when an alternating current is employed the magnetic parts must be as thoroughly laminated as possible to prevent overheating by idle currents.

I claim as my invention—

1. The combination with a magnet-coil having a central opening, of a magnetic collar within such opening, an armature extended through but not engaging with such collar, a clutch actuated by such armature, and non-magnetic means for limiting and guiding the latter in its movements through the collar, as set forth.

2. The combination with a magnet-coil having a central opening and a non-magnetic stop intermediate its ends, of a magnetic collar supported by such stop, an armature extended through but not engaging with such collar, a non-magnetic plug holding said collar to said stop, and a clutch-arm movable with said armature, which latter is limited in its upward movement by said stop, as set forth.

3. The combination with the magnet-coil, of the armature extending therethrough, such armature having a lower tubular portion forming one pole, the carbon-rod extending within the armature, a clutch-arm connected at one end to the armature, its other end being contiguous to, but not engaging with, the lower tubular portion of the armature, such end forming the other pole and designed to engage the carbon-rod, the lines of magnetic force being conveyed from the armature to such end of the clutch, and means for mechanically disengaging the clutch from the carbon-rod when the current ceases to hold the armature, as set forth.

4. The combination with the magnet-coil, of the tubular armature extended therethrough having an opening in its lower portion, the carbon-rod within such armature, a clutch-arm pivotally secured to the upper end of the armature and having its lower end in proximity to the lower portion of the armature, such end of the clutch-arm and the armature forming opposite poles, and said end being designed to engage said carbon-rod, and means for disengaging the clutch-arm from the carbon-rod in the downward movement of the armature, as set forth.

5. The combination with the magnet-coil, of the tubular armature extended therethrough having an opening in its lower portion, the carbon-rod within such armature, a clutch-arm pivotally secured to the upper end of the armature and extending outwardly and downwardly to one side of the coil and inwardly at its lower end, which end is designed to engage said carbon-rod, said end and armature forming opposite poles, and means for automatically throwing the engaging end out of contact with the carbon-rod when the armature is lowered, as set forth.

6. The combination with the magnet-coil, of the tubular armature extended therethrough having an opening in its lower portion, the carbon-rod within such armature, a clutch-arm pivotally secured to the upper end of the armature and extending outwardly and downwardly to one side of the coil and inwardly at its lower end, which end is designed to engage said carbon-rod, said end and armature forming opposite poles, an auxiliary conveyer of the lines of magnetic force connecting the upper and lower portions of the clutch-arm, and means for automatically throwing the engaging end out of contact with the carbon-rod when the armature is lowered, as set forth.

7. The combination with the magnet-coil, of the tubular armature extended therethrough having an opening in its lower portion, the carbon-rod within such armature, a clutch-arm pivotally secured to the upper end of the armature and extending outwardly and downwardly to one side of the coil and inwardly at its lower end, which end is designed to engage said carbon-rod, said end and armature forming opposite poles, a wire cable connecting the upper and lower portions of the clutch-arm, forming an auxiliary conveyer of the lines of magnetic force, and means for automatically throwing the engaging end out of contact with the carbon-rod when the armature is lowered, as set forth.

8. The combination with the magnet-coil having an opening therein, of the tubular armature within such opening, stops for limiting the upward and downward movements of such armature, a carbon-rod within the armature, a clutch-arm pivotally connected at its upper end to the upper end of the armature and extending outwardly beyond one side of the coil and downwardly below the lower end of the latter, the lower end of such arm being designed to engage the carbon-rod, such end, and the contiguous portion of the armature, forming opposite poles, and a fulcrum-bearing above such coil with which the clutch-arm is designed to engage in the downward movement of the armature for throwing the engaging end thereof out of contact with the carbon-rod, as set forth.

9. The combination with the magnet-coil having a central opening, of a tubular armature movable in such opening, stops for limiting the movement of such armature, a carbon-rod within the armature, and a clutch pivotally connected to and carried by the armature at the upper end thereof, such clutch having an engaging portion or portions for gripping and holding the carbon-rod, and means for throwing the clutch out of engagement with the carbon-rod in the downward movement of the armature, as set forth.

10. The combination with the magnet-coil having a central opening, of the magnetic collar within such opening, a plug holding such collar, the diameter of the opening of the collar being greater than that of the opening of the plug, the hollow armature having its upper portion extended through said collar and engaged by said plug, stops for limiting the movements of the armature, and a clutch carried by the armature and designed to engage the carbon-rod in the upward movement of the latter and be automatically disengaged therefrom in the downward movement, as set forth.

11. The combination with the magnet-coil having a central opening, of the collar of magnetic material within such opening, the plug of non-magnetic material holding such collar, the diameter of the opening of the latter being greater than that of the plug, the tubular armature having an enlarged central portion, the upper end of said armature being extended through said collar and guided by said plug, a stop secured to the upper end of the armature, a carbon-rod within the armature, and a clutch-arm pivotally connected at one end to such stop and designed at its other end to engage the carbon-rod, and a fulcrum-bearing with which said clutch-arm is designed to engage in the downward movement of the armature, as set forth.

12. The combination with the magnet-coil having a central opening, of the tubular armature movable in such coil, a stop on the upper end of the armature for limiting the downward movement thereof, said armature being open at its upper end, the carbon-rod capable of being inserted in the armature through the upper end thereof, and means carried by the carbon-rod for forming an electrical connection between the rod and the armature, as set forth.

13. The combination with a magnet-coil having a central opening, of the tubular armature fitted in said opening and having an opening in its lower portion beneath the coil, a carbon-rod within the armature, stops for limiting the upward and downward movements of the armature, a clutch-arm pivotally secured at its upper end to the armature at a point above the magnet-coil, and extending outwardly and downwardly and beneath the latter, the lower end of the clutch-arm being adjacent to the lower tubular portion of the armature and having a tooth extending through the opening of the latter engaging the carbon-rod, and a fulcrum-bearing above the magnet-coil with which the clutch-arm is designed to engage in the downward movement of the armature for throwing the tooth carried by such arm out of engagement with the carbon-rod, as set forth.

14. The combination with a magnet-coil having a central opening, of the tubular armature fitted in said opening and having an opening in its lower portion beneath the coil, a carbon-rod within the armature, stops for limiting the upward and downward movements of the armature, a clutch-arm pivotally secured at its upper end to the armature at a point above the magnet-coil, and extending outwardly and downwardly and beneath the latter, the lower end of the clutch-arm being adjacent to the lower tubular portion of the armature and having a tooth extending through the opening of the latter engaging the carbon-rod, and a fulcrum-bearing above the magnet-coil with which the clutch-arm is designed to engage in the downward movement of the armature for throwing the tooth carried by such arm out of engagement with the carbon-rod, and means for preventing the clutch-arm from swinging axially of the armature, as set forth.

15. The combination with the magnet-coil and the armature movable therein, of the plate, means adjustably connecting such plate to the top of the coil, a stop carried by the armature for engaging the plate, a fulcrum-bearing on such plate, and a clutch-arm pivotally connected to the upper end of the armature-stop and extended downwardly at one side of the coil and at its lower end designed to engage the carbon-rod extended through the armature, as set forth.

16. The combination with a magnet-coil, of the armature extended therethrough having a lower tubular portion, the carbon-rod within such armature, and an arm of magnetic material connected to the upper end of the armature and extended downwardly at one side of the coil and beneath the latter for carrying the lines of magnetic force outside of the magnet-coil and bringing the north and south poles into close proximity with each other, one of the poles being designed to engage the carbon-rod as one pole is drawn toward the other, as set forth.

17. The combination with a hollow armature and a carbon-rod therein, of a head on such rod having a circumferential groove, which groove has an upper flat horizontal wall and a downwardly-curved portion terminating at the periphery of the head, and a series of balls or rollers within such groove for forming electrical connection between the armature and the rod and to permit the latter to move independently of the former, as set forth.

In testimony whereof I have signed this specification in the presence of two subscribing witnesses.

HARLAN P. WELLMAN.

Witnesses:
W. C. RICHARDSON,
RAYMOND O. FISHER.